Feb. 12, 1957 G. E. FEWTRELL ET AL 2,780,906
APPARATUS FOR FORMING MULTI-ELEMENT CABLE
Filed April 2, 1954 2 Sheets-Sheet 1
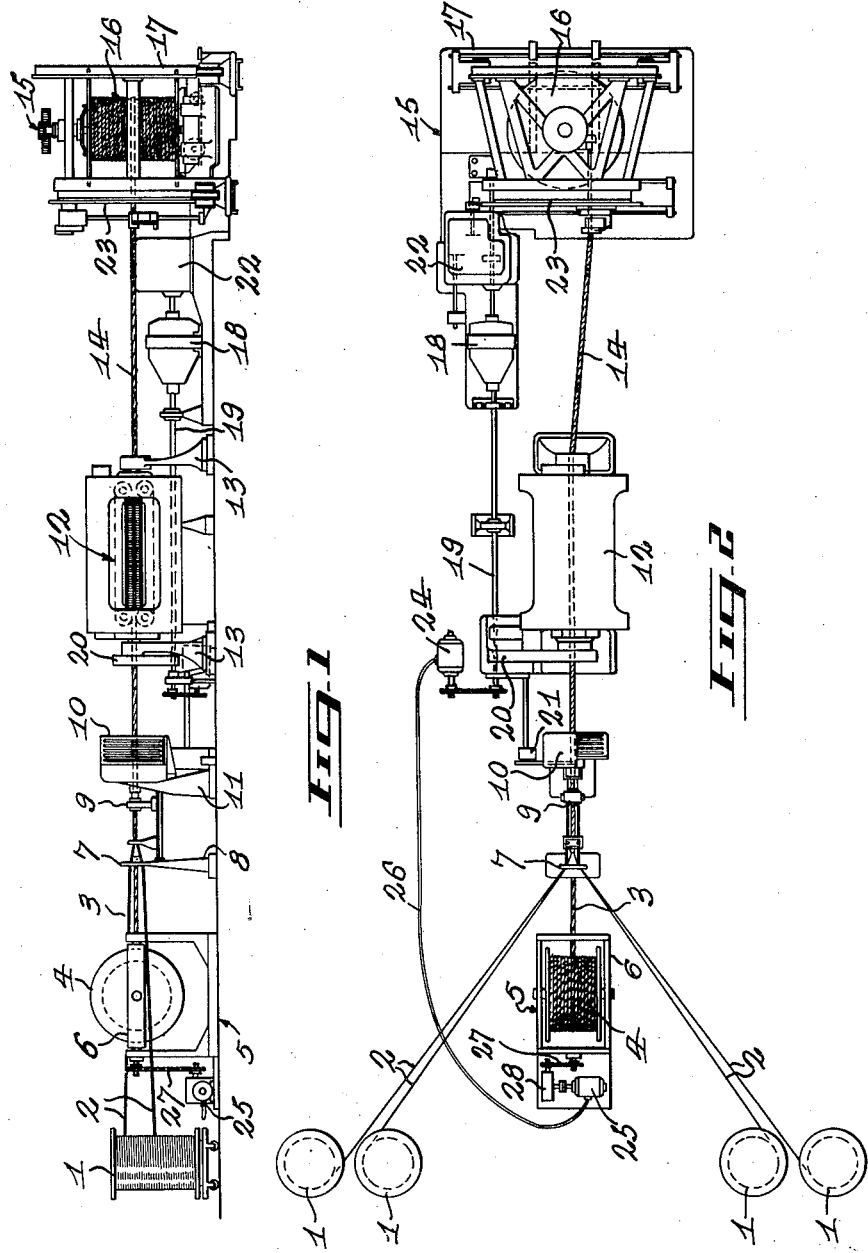
Inventors
George E. Fewtrell
Bruce W. Tyrrell
By Robert B. Harmon
Attorney

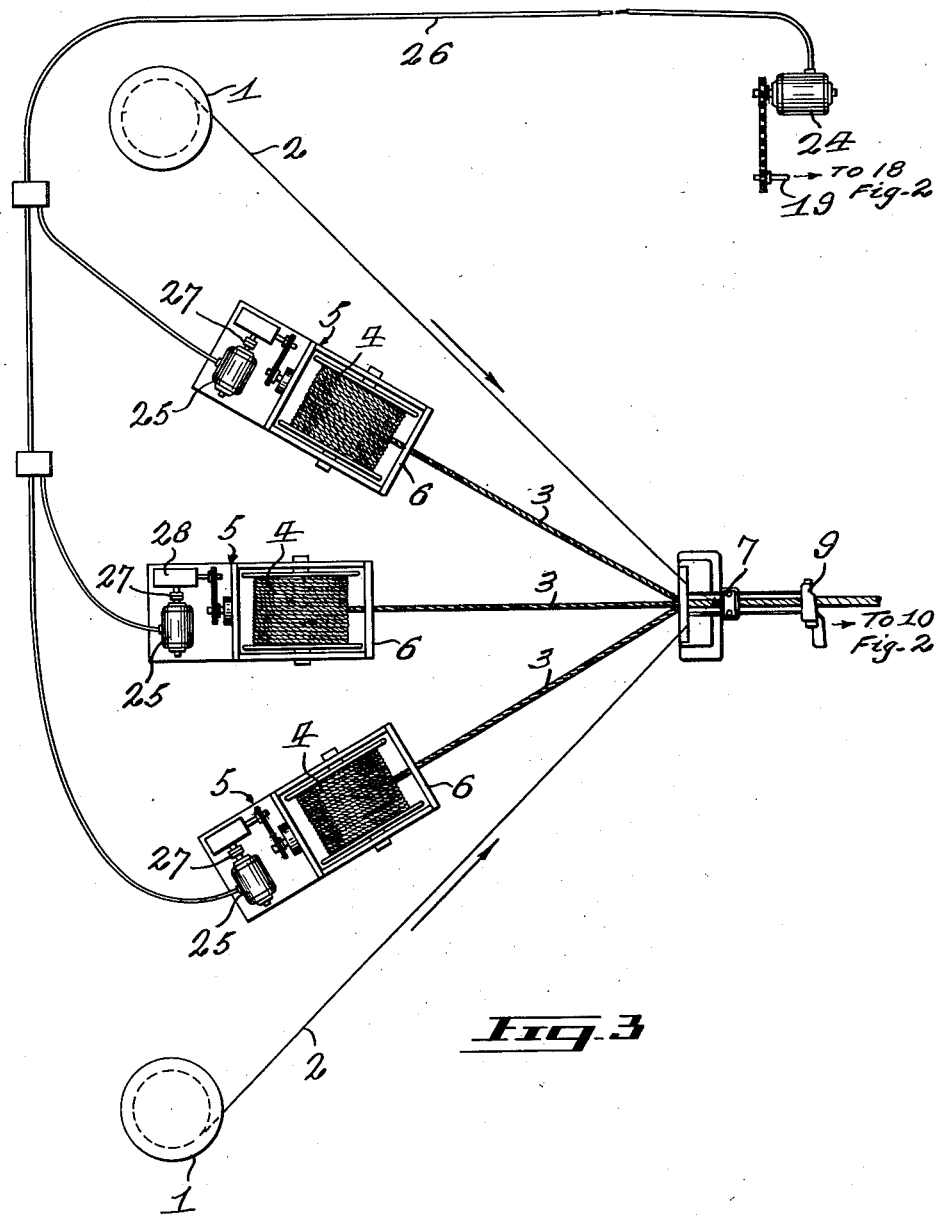

2,780,906
APPARATUS FOR FORMING MULTI-ELEMENT CABLE

George E. Fewtrell and Bruce W. Tyrrell, Montreal, Quebec, Canada, assignors to Northern Electric Company, Limited, Montreal, Quebec, Canada, a corporation of Canada Application April 2, 1954, Serial No. 420,642

11 Claims. (Cl. 57—13)

This invention relates to multi-element cables and more particularly to the method and apparatus for combining the elements into cables.

In the forming of certain electrical cables consisting of a plurality of conductive elements twisted together to form a cable, each of the elements consisting of a plurality of conductors, consideration has to be given with respect to the disposition of the conductors as the cable is formed. In some cables of this type used for the transmission of intelligence, the elements consist of a prestranded central core composed of a plurality of twisted pairs or quads or a combination thereof stranded in layers with the angle of twist per unit of length, or lay, of the layers reversed in direction from layer to layer and a plurality of prestranded cable units of twisted pairs of individual insulated conductors superimposed on the core. In cables of this type it is essential that the conductors of the core should not be twisted from their prestranded interrelation as the cable units are stranded on the core since the tightening of some of the layers and the loosening of others tend to permit the core to kink or bird-cage. These conditions also pertain to cables of a similar nature.

There have been various methods and apparatus devised for the forming of these cables, one of which consists in prestranding the cable units in accordance with the method and apparatus disclosed in U. S. Patent No. 1,956,730, May 1, 1934, to R. O. Reichelt, and U. S. Patent No. 1,813,197, July 7, 1931, to R. O. Reichelt and cabling the cable units over a prestranded central core on a conventional drum strander of the fixed carriage type.

Another method and apparatus for forming the cables consists in prestranding the cable units in accordance with the method and apparatus disclosed in U. S. Patent No. 1,956,730, May 1, 1934, to R. O. Reichelt, and U. S. Patent No. 2,454,329, November 23, 1948, to H. H. Merwin et al. In the former method it is necessary to rewind the units so formed on reels of shorter length than that contained on the core trunks on which the units are stored for use on a drum strander. In the latter method, while the rewinding of the cable units is not necessary, the stranding of the units is slower than that achieved by the former method. Both of these methods have a limitation of the length that may be contained on reels and have a slow cabling speed.

It is an object of this invention to provide improved method and apparatus for the manufacture of multi-element cables.

It is another object of this invention to provide improved method and apparatus to economically and expeditiously manufacture multi-element cables.

It is another object of this invention to provide the method and apparatus for the manufacture of a cable which includes a prestranded central core with a plurality of units twisted thereon, the core and the elements being composed of twisted elements, wherein the original lay of the elements of the core is maintained and that of those of the units may be varied.

It is another object of this invention to provide the method and apparatus for the manufacture of a cable which includes a plurality of units twisted together, each of the units being composed of a plurality of twisted elements, wherein the lay of the units may be varied with respect to each other and the lay of the twisted elements maintained.

It is a further object of this invention to provide the method and apparatus for the manufacture of a cable having a central core with a plurality of units twisted thereon, core and the units being composed of a plurality of twisted elements fabricated more expeditiously and without the limitation with respect to the length of the units twisted on the core as indicated heretofore.

It is a further object of this invention to provide an improved method and apparatus for the manufacture of a cable including a core wherein the geometric interrelations of the strands shaped other than round composing the core are effectively maintained.

It is still a further object of this invention to provide an improved method and apparatus for the manufacture of multi-element cables capable of being adjusted relative to the angle of twist of the elements desired.

These and other objects of the invention are generally obtained by the present invention by providing the method and apparatus whereby the core or cores of the cable are rotated by a dispensing means, on which they are contained, in synchronism with a rotating advancing means and a rotating receiving means so that no twist is imparted to the strands of the cores being advanced as the cable units are disposed thereon, the dispensing means being remotely controlled by the advancing means to maintain the synchronism.

The invention will be better understood by referring to the following description of exemplary embodiments of the invention read in conjunction with the accompanying drawings, like numbers referring to like parts, in which:

Fig. 1 shows a simplified view in elevation of the cabling machine in which the invention is embodied;

Fig. 2 shows a simplified view of the cabling machine, in plan, in which the invention is embodied;

Fig. 3 shows a fragmentary simplified view, in plan, of another embodiment of the invention in which a plurality of give-ups are provided.

The cabling machine of the present invention is a modification of the machine shown in U. S. Patent No. 1,882,902, October 18, 1932, to R. O. Reichelt, the modification being the addition of an auxiliary rotatable give-up and control therefor. Referring to Figs. 1 and 2, a plurality of prestranded units 2, which may be formed in accordance with the method disclosed in U. S. Patent 1,956,730, May 1, 1934, to R. O. Reichelt, and U. S. Patent 1,813,197, July 7, 1931, to R. O. Reichelt, and contained on core trucks 1, are superimposed on core 3 consisting of a plurality of twisted pairs or quads or a combination thereof stranded in layers reversed in direction from layer to layer which are contained on a self-rotating stationary reel 4 and supported by frame 5, the portion 6 being known as the give-up. The units 2 and the core 3 are drawn through the face plate 7 supported by standard 8, crushing dies 9, supported by standard 8, tape lapping head 10 if desired which is supported by standard 11, caterpillar capstan 12 supported by standards 13, which advances the completed cable 14 to the take-up 15 and imparts to the core 14 the desired cable lay by means of its rotation, the take-up 15 having a self-rotating stationary core truck 16, supported by the frame 17 to contain the completed cable 14 as described in U. S. Patent 1,882,902. An electrical motor 18 rotates the capstan 12, and taping head 10 by means of the main shaft 19 and gearing 20, 21. Motor 18 also rotates the take-up 15, through gearing 22, 23. A transmitting selsyn motor 24 driven through gearing 20 is connected electrically to receiver selsyn motor 25 by cable 26, the rotor of which duplicates all the movements of rotor of the motor 24. Motor 25 rotates the give-up 6 through drive 27 and gearing 28.

In operation the gearings 20, 22 are adjusted so that the capstan 12 and the take-up 15 rotate at the speed required for the desired angle of the lay of the units 2 being cabled on the core 3. The gearing 28 of the give-up 6 is then adjusted so that the give-up 6 rotates in synchronism with capstan 12 and the take-up 15. In this manner any twist which is applied to the core 3 is equalized by the rotation of the give-up 6 by reason of the fact that any variation at the capstan 12 and take-up 15 is transmitted to the selsyn motor 24, this variation being duplicated at the selsyn motor 25 thus allowing the give-up 6 to adjust itself for this change. It will be apparent that gearings 20, 22 may be adjusted relative to the gearing 28 to establish a twist in the core 3 and any variation in this adjustment will be adjusted in the manner noted above.

Fig. 3 shows another embodiment of the invention in which a plurality of give-ups 6, of which 3 are shown, having the cores 3 contained thereon are used, on which the units 2 are cabled. By adjusting the gear ratios of the gearings 20 and 28 an over twist or under twist can be imparted to the cores 3, either singly or in combination, with respect to the units 2. It will also be apparent that a plurality of cores 3 can be formed either with or without a twist without the units 2 being cabled thereon and any variation from this adjustment will be adjusted in the manner heretofore described.

It will also be apparent that in these embodiments that elements, such as metallic tape, may be employed in place of the units 2.

It will be perceived that the invention permits the manufacture expeditiously of cables which include prestranded core or cores with or without elements twisted thereon with the restriction as to the length of units cabling over the cores reduced and with a flexibility of operation to permit the production of cables of various lays of the elements.

It will also be observed that when the central core 3 of the cable is composed of strands of angular shape that this invention permits the maintaining of these strands in geometrical interrelation as the cable is formed.

What is claimed is:

1. In a material handling apparatus for forming a multi-element cable which includes a prestranded central core composed of a plurality of elements in twisted interrelation with each other and a plurality of prestranded cable units superimposed thereover, comprising in combination: a rotatable core dispensing means having the central core disposed thereon; a rotatable cable receiving means on which the completed cable is contained; advancing means to advance the central core longitudinally away from the dispensing means and to contemporaneously twist the units on the advancing central core; a plurality of rotatable stationary supply means on which the units are contained; means to position the units on the advancing central core; common means to actuate the receiving and advancing means; actuating means to rotate the dispensing means about the axis in the direction of advance of the central core; individual adjustable means associated with the common actuating means and the actuating means to adjust and thereby synchronize the speed of rotation of the dispensing means with that of the advancing and receiving means; whereby the central core is advanced so that the interrelation of the twists of the strands thereof is maintained as the units are superimposed thereover.

2. In a material handling apparatus for forming a multi-element electrical cable which includes a prestranded core composed of a plurality of conductors in twisted interrelation with each other and a plurality of prestranded cable units superimposed thereover each of which is composed of a plurality of insulated conductors comprising in combination: a rotatable core dispensing means having the central core disposed thereon; a rotatable cable receiving means on which the completed cable is contained; advancing means to advance the central core longitudinally away from the dispensing means and to contemporaneously twist the units on the advancing central core; a plurality of rotatable stationary cable supply means on which the units are contained; means to position the units on the advancing central core; common means to actuate the receiving and advancing means; actuating means to rotate the dispensing means about the axis in the direction of advance of the central core; individual adjustable means associated with the common and actuating means to adjust and thereby synchronize the speed of rotation of the dispensing means with that of the advancing and receiving means; whereby the central core is advanced so that the interrelation of the twists of the strands thereof is maintained as the units are superimposed thereover.

3. In a material handling apparatus for forming a multi-element cable which includes a prestranded central core composed of a plurality of strands angularly shaped in twisted interrelation with each other and a plurality of prestranded cable units superimposed thereover, comprising in combination; a rotatable core dispensing means having the central core disposed thereon; a rotatable cable receiving means on which the completed cable is contained; advancing means to advance the central core longitudinally away from the dispensing means and to contemporaneously twist the units on the advancing central core; a plurality of rotatable stationary supply means on which the units are contained; means to position the elements on the advancing central core; common means to actuate the receiving and advancing means; actuating means to rotate the dispensing means about the axis in the direction of advance of the central core; individual adjustable means associated with the common and actuating means to adjust and thereby synchronize the speed of rotation of the dispensing means with that of the advancing and receiving means; whereby the central core is advanced so that the geometrical interrelation of the twists thereof is maintained as the units are superimposed thereon.

4. In a material handling apparatus for forming a multi-element electrical cable which includes a prestranded core, composed of a plurality of conductors angularly shaped in twisted interrelation with each other and a plurality of prestranded cable units superimposed thereover, each of which is composed of a plurality of insulated conductors comprising in combination: a rotatable core dispensing means having the central core disposed thereon; a rotatable cable receiving means on which the completed cable is contained; advancing means to advance the central core longitudinally away from the dispensing means and to contemporaneously twist the units on the advancing central core; a plurality of rotatable staionary cable supply means on which the units are contained; means to position the units on the advancing central core; common means to actuate the receiving and advancing means; actuating means to rotate the dispensing means about the axis in the direction of advance of the central core; individual adjustable means associated with the common and actuating means to adjust and thereby synchronize the speed of rotation of the dispensing means with that of the advancing and receiving means; whereby the central core is advanced so that the geometrical interrelation of the twist of the strands thereof are maintained as the units are superimposed thereover.

5. In a material handling apparatus for forming a multi-element electrical cable which includes a central core composed of a plurality of conductors in twisted interrelation with each other and a protective material superimposed thereover, comprising in combination: a rotatable core dispensing means having a central more disposed thereon; a rotatable cable receiving means on which the completed cable is contained; advancing means to advance the central core longitudinally away from the dispensing means and to contemporaneously twist the protective material on the advancing central core; a rotatable staionary supply means on which the protective material is contained, means to position the protective material on the advancing central core; common means to actuate the receiving and advancing means; actuating means to rotate the dispensing means about the axis in the direction of advance of the central core; individual adjustable means associated with the common and actuating means to adjust and thereby synchronize the speed of rotation of the dispensing means with that of the advancing and receiving means; whereby the central core is advanced so that the interrelation of the twists of the conductors thereof are maintained as the protective material is superimposed thereover.

6. In a material handling apparatus in accordance with claim 1, in which the actuating means consists of a receiving selsyn device having in combination therewith a remote control means to automatically maintain the said synchronism which comprises a transmitting selsyn device actuated by the common means, said receiving selsyn device being controlled thereby.

7. In a material handling apparatus in accordance with claim 3 in which the actuating means consists of a receiving selsyn device having in combination therewith a remote control means to automatically maintain the said synchronism which comprises a transmitting selsyn device actuated by the common means, said receiving selsyn device being controlled thereby.

8. In a material handling apparatus in accordance with claim 4 in which the actuating means consists of a receiving selsyn device having in combination therewith a remote control means to automatically maintain the said synchronism which comprises a transmitting selsyn device actuated by the common means, said receiving selsyn device being controlled thereby.

9. In a material handling apparatus in accordance with claim 5 in which the actuating means consists of a receiving selsyn device having in combination therewith a remote control means to automatically maintain the said synchronism which comprises a transmitting selsyn device actuated by the common means, said receiving selsyn device being controlled thereby.

10. In a material handling apparatus for forming multi-elements which includes a plurality of prestranded cores twisted together, each of the cores being composed of a plurality of conductors in twisted interrelation with each other, comprising in combination: a plurality of dispensing means on which the cores are individually contained; a rotatable receiving means in which the completed cable is contained; advancing means to advance the cores longitudinally away from the dispensing means and to contemporaneously twist the cores together; common means to actuate the receiving and advancing means; individual actuating means to rotate the individual dispensing means about the axis in the direction of advance of the prestranded core; and individual adjustable means associated with the common and actuating means to adjust the relative speed of rotation of the dispensing and receiving means.

11. In a material handling apparatus in accordance with claim 10 in which the actuating means consist of receiving selsyn devices having in combination therewith a remote control means to automatically maintain the desired relative speed of rotation of the dispensing means to the advancing and receiving means, which comprises a transmitting selsyn device being actuated by the common means, said receiving selsyn devices being controlled thereby.

References Cited in the file of this patent

UNITED STATES PATENTS

| Number | Name | Date |
| --- | --- | --- |
| 1,600,826 | Langos | Sept. 21, 1926 |
| 1,813,197 | Reichelt | July 7, 1931 |
| 1,961,379 | Morgan | June 5, 1934 |
| 1,984,405 | Fantone | Dec. 18, 1934 |
| 2,454,329 | Merwin et al. | Nov. 23, 1948 |